United States Patent [19]

Gergele

[11] Patent Number: 4,473,257

[45] Date of Patent: Sep. 25, 1984

[54] ASSEMBLY OF A CENTRALLY ATTACHED WHEEL DISK AND A BRAKE CROWN

[75] Inventor: Jean Gergele, St-Hyppolyte, France

[73] Assignee: Compagnie Generale des Etablissements Michelin, Clermont-Ferrand, France

[21] Appl. No.: 457,713

[22] Filed: Jan. 3, 1983

[30] Foreign Application Priority Data

Jan. 18, 1982 [FR] France .................................. 82 00941

[51] Int. Cl.³ .......................... B60B 3/14; F16D 55/12
[52] U.S. Cl. .................................. 301/6 W; 188/76; 301/9 CN; 301/9 DN
[58] Field of Search ................... 188/18 R, 218 R, 76; 301/6 R, 6 W, 6 WB, 9 CN, 9 CS, 37 CS

[56] References Cited

U.S. PATENT DOCUMENTS

| 1,646,866 | 10/1927 | Ludwick | .......................... 301/9 CN |
| 3,295,636 | 1/1967 | Adams | ............................... 188/76 X |

FOREIGN PATENT DOCUMENTS

| 1047490 | 12/1953 | France | .............................. 301/9 DN |
| 2001718 | 2/1979 | United Kingdom | .................. 188/76 |

*Primary Examiner*—David A. Scherbel
*Attorney, Agent, or Firm*—Brumbaugh, Graves, Donohue & Raymond

[57] ABSTRACT

In accordance with the invention, a brake crown is fastened to a wheel disk in a crown attachment zone located between a major curved zone of the disk and a zone of attachment of the disk to a rim, and a central attachment comprises a cylindrical portion, a first curved zone against which a central bolt for fastening the disk to a hub rests and a second curved zone against which an attachment face of the hub rests.

5 Claims, 1 Drawing Figure

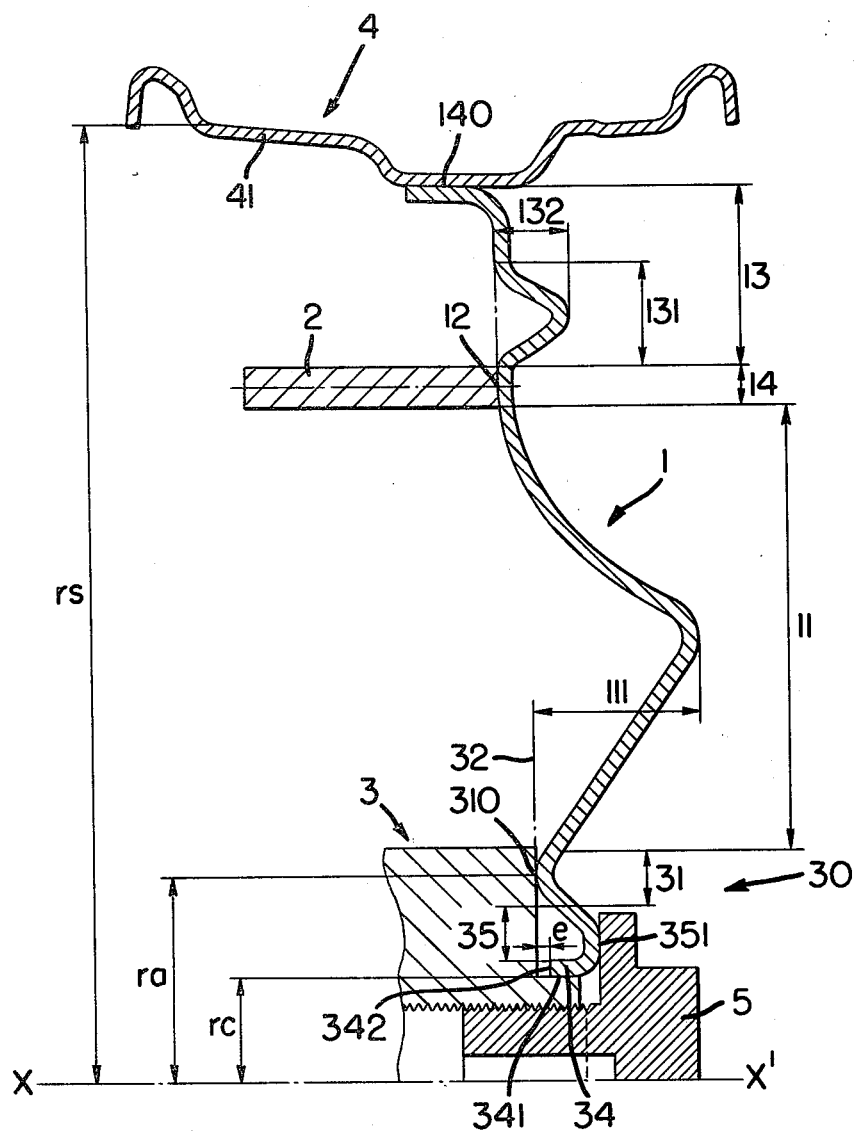

ASSEMBLY OF A CENTRALLY ATTACHED WHEEL DISK AND A BRAKE CROWN

The present invention relates to centrally attached wheels cooperating with a crown brake.

A vehicle wheel essentially comprises a disk and a rim. The rim is intended to receive a tire. It is fastened to the disk at the periphery of the latter. Near its center the disk has means for attachment to the hub of the vehicle and for centering on the hub.

A crown brake essentially comprises a cylindrical crown, which rotates with the wheel and is fastened coaxial to it, and a clamp which is actuated by the brake jack, which clamp has friction linings which rub on the crown and is immobilized relative to the vehicle.

Two systems of attaching the wheels to the hubs have gained introduction into practice. The first system comprises a plurality of bolts or lugs with nuts distributed over a circumference, the hub being provided with a flat face perpendicular to the axis of rotation of the wheel (the so-called attachment-plane face) against which the corresponding portion of the disk provided with holes is clamped. The other system, known as central attachment, comprises a single bolt or lug with nut, coaxial to the axis of rotation of the wheel, the central portion of the disk and hub being provided with elements which effect both the centering of the wheel and the exchange of forces between the wheel and the hub. In this case centering is rather easy to effect. On the other hand, the transmission of the braking and drive torques has not made it possible up to now to use simple and therefore inexpensive central attachment systems.

Thus the research work of the applicant has led, in the case of an assembly formed of a centrally attached wheel disk and a brake crown to combining, in accordance with the invention, a special attachment of the brake crown to the wheel disk with a central attachment system which utilizes the friction of the disk against the hub in order to transmit the forces between the wheel and the hub. Prior to the invention the brake crown was, as a matter of fact, fastened to the hub. Thus the central attachment of the wheel to the hub, that is to say the central portion of the wheel and the corresponding portion of the hub, were of costly and complicated design in order to be able to transmit the braking forces with full reliability.

The basic idea of the invention consists, on the one hand, of fastening the brake crown to the disk. On the other hand, this arrangement makes it possible to design a device for the central attachment of the wheel disk to the hub which employs the friction of the disk on the corresponding portion of the hub. The combination of these means in such an assembly avoids the transmission of the braking forces by the central attachment. The transmission of the braking forces from the ground to the vehicle thus takes place between the tire, the rim, the portion of the disk contained between the rim and the brake crown and the brake clamp which is immobilized with respect to the vehicle, avoiding passage through the central attachment and the hub. Due to the combination in accordance with the invention, the central attachment is fixed in rotation only by the friction obtained by the pressure of the disk against the hub along a crest of relatively small diameter which is generally sufficient to transmit the driving forces of the hub to the wheel, that is to say to the disk of the latter.

Thus the invention relates to an assembly comprising a wheel for tires and a cylindrical crown for crown brakes, the brake crown being coaxial to and rigidly attached to the wheel, the wheel being formed, on the one hand, of a disk with a central attachment for attaching to a hub of a vehicle which disk is extended radially outwards of the central attachment by a major curved zone which is curved towards the outside of the vehicle and, on the other hand, of a rim fastened to the disk and having a tire bead seat, characterized by the fact that the brake crown has an attachment to the wheel disk along a crown attachment zone located radially outwards of the major curved zone of the disk; and by the fact that the central attachment comprises the following elements which form part of the disk and are arranged one after the other radially towards the outside of the wheel:

(a) a cylindrical portion coaxial with the axis of the wheel and fitting on a corresponding portion of the hub, (b) a first curved zone curved towards the outside of the vehicle forming a crest against which there is intended to rest a central nut or bolt for fastening the disk to the hub, and (c) a second curved zone curved towards the inside of the vehicle forming a crest having a preferably flat face which is intended to rest against a corresponding portion of the hub.

A preferred variant of the invention, the purpose of which variant is furthermore to avoid deformations of the brake crown which might have a repercussion on the effectiveness of the braking and cause disturbing vibrations and local wear of the brake crown, is characterized by the fact that within the portion of the disk contained between the crown attachment zone and the rim there is provided a third curved zone which is curved preferably towards the outside of the vehicle and which has an axial length, measured with reference to the crown attachment, less than the axial length of the major curved zone, measured with reference to the crest of the second curved zone of the central attachment which rests against the hub.

It is known to fasten cylindrical ferrules to a wheel disk, for instance by means of weld beads, concentrically to the region of attachment of the disk to the hub of the vehicle. These ferrules are intended to hold a decorative element which conceals the region of attachment of the disk to the hub as well as to make up for the lack of rigidity of the disk with respect to the forces which it transmits from the hub to the rim. In these known applications, the deformations suffered by the ferrules during the working of the wheel are of little importance. The preferred variant of the invention, on the other hand, has the purpose of considerably reducing the deformations of the brake crown resulting from the deformations of the rim. The third curved zone, which is provided in accordance with said variant between the brake crown attachment zone and the rim, isolates the brake crown from the deformations of the rim.

The sole figure of the accompanying drawing schematically illustrates—and this is described below—one embodiment of a combination of wheel and brake crown in accordance with the invention, comprising the preferred variation thereof.

The drawing shows in a radial section a metal wheel disk 1 fastened to a metal rim 4, a metal crown 2 of a crown brake (otherwise not shown) and the central attachment 30 of the wheel disk 1 to the hub 3. The axis of rotation of the assembly is XX'. Radially outward of the central attachment 30 of the disk 1 to the hub 3 there is a major curved zone 11 curved towards the outside of the vehicle (the vehicle not being shown). In accordance with the invention, the cylindrical brake crown 2 is fastened to the wheel disk 1. The attachment 12 of the brake crown 2 to the disk 1 is located radially outwards of the above-mentioned major curved zone 11.

The attachment 12 of the brake crown 2 to the wheel disk 1, in accordance with the invention, is located in a flat crown attachment zone 14 of the disk 1. In this embodiment, this flat crown attachment zone 14 is offset axially towards the inside of the vehicle with reference to the crest 310 of the second curved zone 31 of the central attachment 30 of the disk 1. However, an axial offset of this flat crown attachment zone 14 towards the outside of the vehicle falls within the scope of the invention.

In accordance with the invention, the central attachment 30 of the wheel disk 1 comprises the following elements which form part of the disk 1 and are arranged one after the other radially towards the outside of the wheel: (a) a cylindrical portion 34, (b) a first curved zone 35 curved towards the outside of the vehicle, and (c) a second curved zone 31 curved towards the inside of the vehicle. The inner cylindrical portion 34, the inside of which also is cylindrical, is coaxial with the axis XX' of the wheel, fits on a corresponding cylindrical portion 341 of the hub 3 and assures the centering of the wheel on the hub 3. Against the crest 351 of the first curved zone 35 there rests the bearing surface of the head of the bolt 5 for the central attachment of the disk 1 to the hub 3. The crest 310 of the second curved zone 31 forms a flat resting face of the disk on the corresponding plane of attachment 32 of the hub 3. The cylindrical portion 34 of the central attachment 30 is preferably provided with a flat axially inner terminal face 342 which is axially set back towards the outside of the vehicle by an amount e with reference to the crest 310 of the second curved zone 31, that is to say the plane of attachment 32 of the hub 3, this plane of attachment 32 continuing up to the level of the face 341 of the cylindrical portion 34 of the hub 30.

The spacing e between the flat axially inner terminal face 342 of the cylindrical portion 34 and the plane of attachment 32 makes it possible to proportion the clamping force of the bolt 5 of the central attachment 30 by tightening the bolt 5 until the flat axially inner terminal face 342 of the cylindrical portion 34 comes into contact with the plane of attachment 32 due to the axial stiffness of the central attachment 30. The cancelling of the spacing e also makes it possible to impart to the crest 310 of the second curve zone 31 the necessary pressure against the hub 3 in order to produce friction sufficient for the transmission of the driving torque to the wheel.

As a result of the invention the radius $r_a$ of the crest 310 of the second curved zone 31 of the central attachment 30 of the disk 1 can be reduced to a value at most equal to 30% of the radius $r_s$ of the tire bead seat 41 of the rim 4, this radius $r_s$ being measured in accordance with the standards in effect.

Due to the invention, in the case of a vehicle wheel with a brake crown intended to bear a load of less than 600 kg, the crest 310 of the second curved zone 31 of the central attachment 30 can be arranged on a radius $r_a$ of less than 50 mm from the axis of rotation XX' of the wheel, the second curved zone 31 itself having a radius of outer curvature (to the outside of the vehicle) at most equal to 8 mm. The radially inner cylindrical face 341 of the cylindrical portion 34 of the central attachment 30 is arranged on a radius $r_c$ at least equal to 25% of the radius of the crest 310 of the second curved zone 31, namely 12.5 mm. In view of the spacing e between the flat axially inner terminal face 342 of the cylindrical portion 34 and the hub 3 before the tightening of the central bolt 5, it is advantageous to provide an axial stiffness of the central attachment 30 at most equal, in this example, to $10^8$ N/m.

In accordance with the preferred variant, within the portion 13 of the disk 1 contained between the crown attachment zone 14 of the brake crown 2 to the wheel disk 1 and the attachment 140 of the rim 4 to the wheel disk 1 there is provided a third curved zone 131. The axial length 132 of this third curved zone 131 which is curved in this example towards the outside of the vehicle, measured with reference to the crown attachment 12 of the brake crown 2 to the wheel disk 1, is less than the axial length 111 of the major curved zone 11, measured with reference to the crest 310 of the second curved zone 31 of the central attachment 30 of the disk 1 to the hub 3 in contact with the attachment plane 32 of the hub 3.

What is claimed is:

1. An assembly comprising a wheel for tires and a cylindrical crown for crown brakes, the brake crown being coaxial to and rigidly attached to the wheel, the wheel being formed, on the one hand, of a disk with a central attachment for attaching to a hub of a vehicle which disk is extended radially outwards of the central attachment by a major curved zone which is curved towards the outside of the vehicle and, on the other hand, of a rim fastened to the disk and having a tire bead seat, characterized by the fact that the brake crown has an attachment to the wheel disk along a crown attachment zone located radially outwards of the major curved zone of the disk; and by the fact that the central attachment comprises the following elements which form part of the disk and are arranged one after the other radially towards the outside of the wheel:

(a) a bent cylindrical portion coaxial with the axis of the wheel and fitting on a corresponding portion of the hub, (b) a first curved zone curved towards the outside of the vehicle forming a crest against which there is intended to rest a central nut or bolt for fastening the disk to the hub, and (c) a second curved zone curved towards the inside of the vehicle forming a crest having a preferably flat face which is intended to rest against a corresponding portion of the hub.

2. An assembly according to claim 1, characterized by the fact that within the portion of the disk contained between the crown attachment zone and the rim there is provided a third curved zone which is curved preferably towards the outside of the vehicle and which has an axial length, measured with reference to the crown attachment, less than the axial length of the major curved zone, measured with reference to the crest of the second curved zone of the central attachment which rests against the hub.

3. An assembly according to claim 1, characterized by the fact that the cylindrical portion of the central attachment of the disk has a flat axially inner terminal face which is axially set back towards the outside of the vehicle with reference to the crest of the second curved zone of the central attachment before the tightening of the central fastening bolt or nut.

4. An assembly according to claim 1, 2 or 3, characterized by the fact that the radius of the crest of the second curved zone of the central attachment of the disk has a value at most equal to 30% of the radius of the tire bead seat of the rim.

5. An assembly according to claim 4, characterized by the fact that the cylindrical portion of the central attachment of the disk has a radially inner cylindrical face with a radius at least equal to 25% of the radius of the crest of the second curved zone of the central attachment of the disk.

* * * * *